(12) United States Patent
Kondo et al.

(10) Patent No.: US 12,139,002 B2
(45) Date of Patent: Nov. 12, 2024

(54) BATTERY MOUNTING PART SUPPORT STRUCTURE OF VEHICLE

(71) Applicant: HONDA MOTOR CO., LTD., Tokyo (JP)

(72) Inventors: Takehiro Kondo, Tokyo (JP); Ryoji Tokuda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 340 days.

(21) Appl. No.: 17/687,694

(22) Filed: Mar. 7, 2022

(65) Prior Publication Data

US 2022/0314777 A1 Oct. 6, 2022

(30) Foreign Application Priority Data

Mar. 30, 2021 (JP) .................. 2021-058506

(51) Int. Cl.
*B60K 1/04* (2019.01)
(52) U.S. Cl.
CPC ..................... *B60K 1/04* (2013.01)
(58) Field of Classification Search
CPC .......... B60K 1/04; B62D 25/082; B60R 16/04
See application file for complete search history.

(56) References Cited

U.S. PATENT DOCUMENTS 10,249,858 B2 * 4/2019 Konoura ................. B60L 50/64

FOREIGN PATENT DOCUMENTS

JP 2005056641 A 3/2005
WO 2016163224 A1 10/2016

* cited by examiner

*Primary Examiner* — Jason D Shanske
*Assistant Examiner* — James J Triggs
(74) *Attorney, Agent, or Firm* — CKC & Partners Co., LLC

(57) ABSTRACT

Provided is a battery mounting part support structure of a vehicle, in which a pair of battery support legs can also be disposed at portions other than inside of a front side frame, which can stably support the pair of battery support legs and which can achieve reduction in weight. The battery mounting part support structure of the vehicle includes a front support leg 34 and a rear support leg 31, 32 that support a battery B and a coupling member 33 that couples the front support leg 34 and the rear support leg 32, and the front support leg 34 and the rear support leg 31, 32 are supported by an upper surface and a side surface 112 of a front side frame 11 on a front side and a rear side of the coupling member 33.

12 Claims, 9 Drawing Sheets

BATTERY MOUNTING PART SUPPORT STRUCTURE OF VEHICLE

This application is based on and claims the benefit of priority from Japanese Patent Application No. 2021-058506, filed on 30 Mar. 2021, the content of which is incorporated herein by reference.

BACKGROUND OF THE INVENTION

Field of the Invention

The present invention relates to a battery mounting part support structure of a vehicle.

Related Art

In related art, for a vehicle in which a battery is mounted within an engine compartment in a vehicle body front portion, a configuration is known in which a battery support leg that supports the battery is disposed inside a front side frame (see, for example, Patent Document 1).

Patent Document 1: PCT International Publication No. WO2016/163224

SUMMARY OF THE INVENTION

Among vehicles in which a battery is mounted within an engine compartment in a vehicle body front portion, vehicles having a configuration which does not allow a battery support leg to be disposed inside a front side frame as in the above-described configuration in related art are increasing due to engine types. The present invention is directed to providing a battery mounting part support structure of a vehicle, in which a pair of battery support legs can also be disposed at portions other than inside of a front side frame, which can stably support the pair of battery support legs and which can achieve reduction in weight.

(1) A battery mounting part support structure (for example, a battery mounting part support structure 30 which will be described later) of a vehicle according to the present invention includes a front support leg (for example, a front support leg 34 which will be described later) and a rear support leg (for example, a rear reinforcing bracket 31, a rear support leg body 32 which will be described later) that support a battery (for example, a battery B which will be described later), and a coupling member (for example, a coupling member 33 which will be described later) that couples the front support leg and the rear support leg, and the front support leg and the rear support leg are supported by an upper surface (for example, an upper surface 111 which will be described later) and a side surface (for example, a side surface 112 which will be described later) of a front side frame (for example, a front side frame 11 which will be described later) on a front side and a rear side of the coupling member.

(2) In the battery mounting part support structure of the vehicle in (1), each of the front support leg and the rear support leg may include a battery mounting surface (for example, a battery mounting surface 321, a battery mounting surface 341 which will be described later), a support wall (for example, a support wall 323, a support wall 343 which will be described later) and an abutting surface (for example, an abutting surface 3236, an abutting surface 3436 which will be described later).

(3) In the battery mounting part support structure of the vehicle in (2), a vertical bead (for example, a vertical bead 3231, a vertical bead 3431 which will be described later) that extends in an up-down direction from the battery mounting surface to the abutting surface may be provided on one of the front support leg and the rear support leg.

(4) In the battery mounting part support structure of the vehicle in (1), the coupling member may include a pair of flanges (for example, a front flange 333 and a rear flange 332 which will be described later) that are bent so as to face the front support leg and the rear support leg.

(5) In the battery mounting part support structure of the vehicle in (3), the vertical bead may be continuous with a front-back bead that extends in a front-back direction of the coupling member.

(6) In the battery mounting part support structure of the vehicle in (2), the rear support leg may be joined to the upper surface and the side surface of the front side frame by a rear reinforcing bracket (for example, the rear reinforcing bracket 31 which will be described later) provided as another member.

(7) In the battery mounting part support structure of the vehicle in (2), the support wall of the rear support leg may be provided obliquely with respect to the front-back direction in planar view, and the coupling member may be provided at a lower position than the battery mounting surface and provided in a folding-fan shape that extends in at least one of a forward direction or a rearward direction.

(8) In the battery mounting part support structure of the vehicle in (2), the front support leg may be joined to the side surface of the front side frame by a front reinforcing bracket (for example, a front reinforcing bracket 35 which will be described later) provided as another member.

(9) In the battery mounting part support structure of the vehicle in (8), the coupling member may extend in a vehicle width direction and may be joined to the upper surface of the front side frame and an upper surface (upper surface 351) of the front reinforcing bracket.

(10) In the battery mounting part support structure of the vehicle in (8), the rear support leg may be joined to the upper surface and the side surface of the front side frame by a rear reinforcing bracket provided as another member, and each of the front reinforcing bracket and the rear reinforcing bracket may extend away from the side surface of the front side frame in a vehicle width direction.

(11) In the battery mounting part support structure of the vehicle in (8), the battery mounting surface may be disposed so as to intersect with a front end portion of the front side frame.

(12) In the battery mounting part support structure of the vehicle in (1), the front support leg may be provided in a vicinity of a center of gravity (center of gravity BG) of the battery.

(13) In the battery mounting part support structure of the vehicle in (6), the rear support leg may be bent and joined so as to overlap with the rear reinforcing bracket.

According to the present invention, it is possible to provide a battery mounting part support structure of a vehicle, in which a pair of battery support legs can also be disposed at portions other than inside of a front side frame, which can stably support the pair of battery support legs and which can achieve reduction in weight.

DETAILED DESCRIPTION OF THE INVENTION

Figure 1:
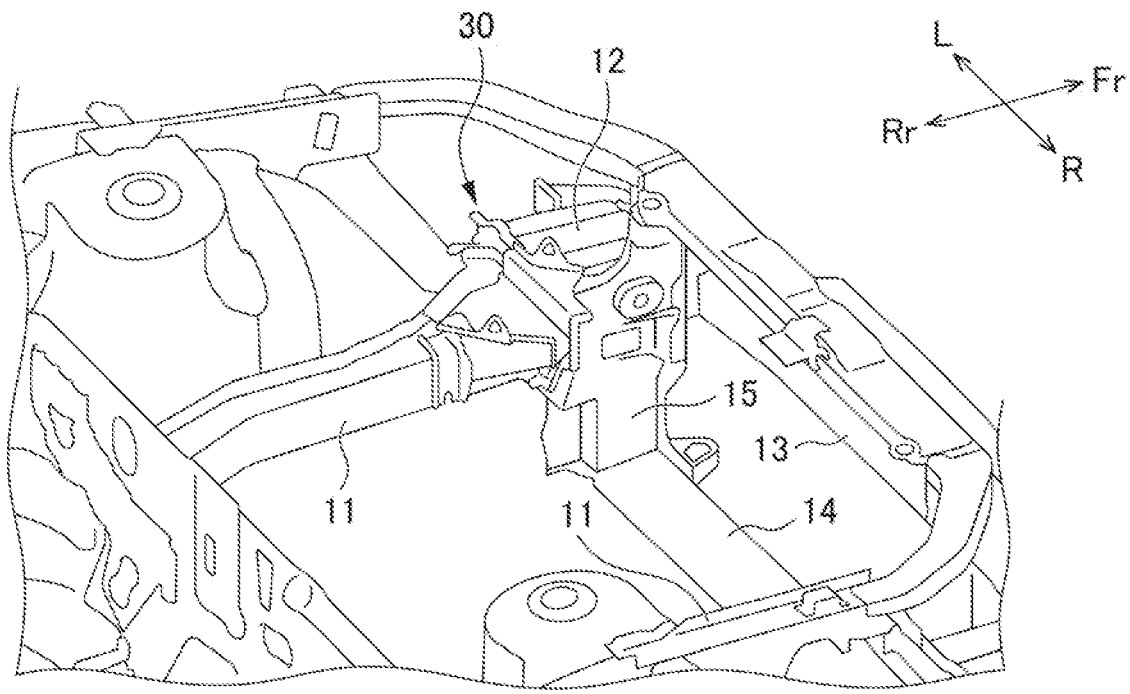
FIG. 1 is a perspective view illustrating a portion around a front side frame, in which a battery mounting part support structure of a vehicle according to one embodiment of the present invention is provided.
Figure 2:
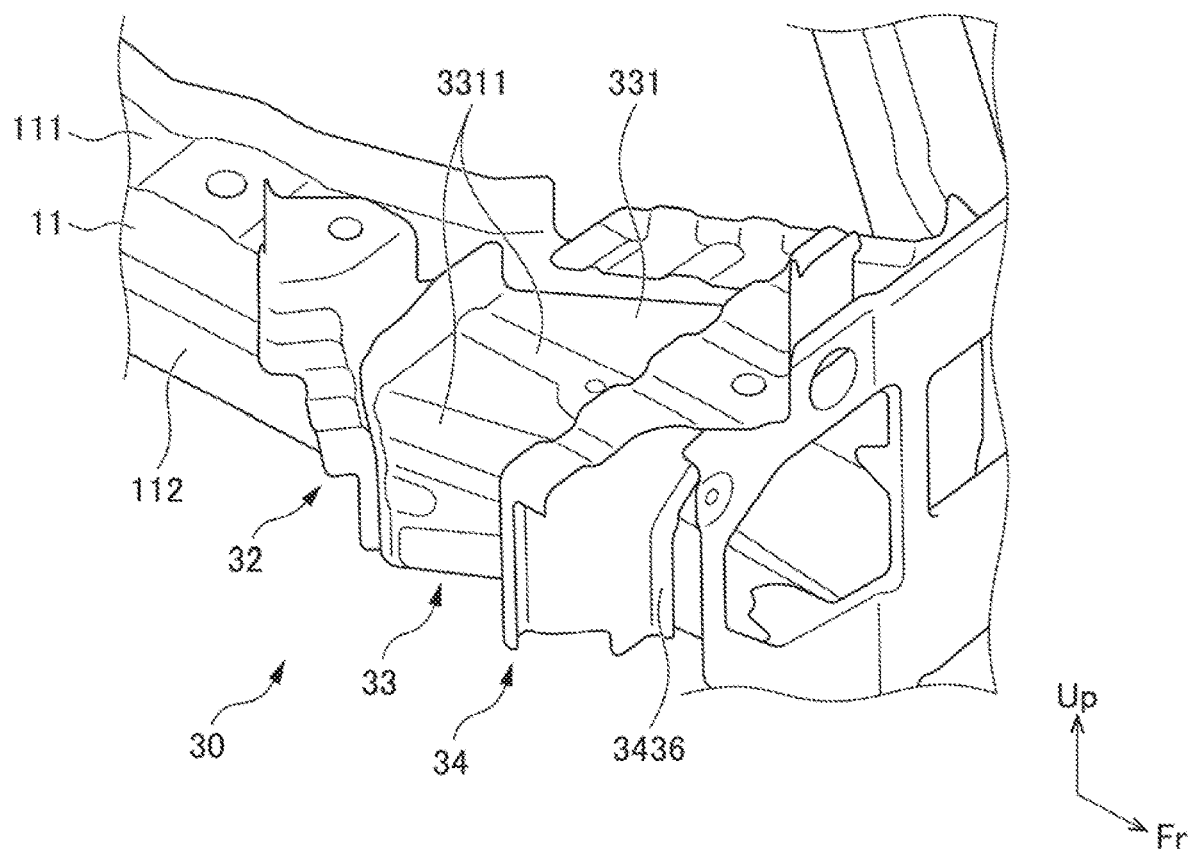
FIG. 2 is an enlarged perspective view illustrating a portion around the front side frame, in which the battery mounting part support structure of the vehicle according to one embodiment of the present invention is provided, viewed from the front and above.
Figure 3:
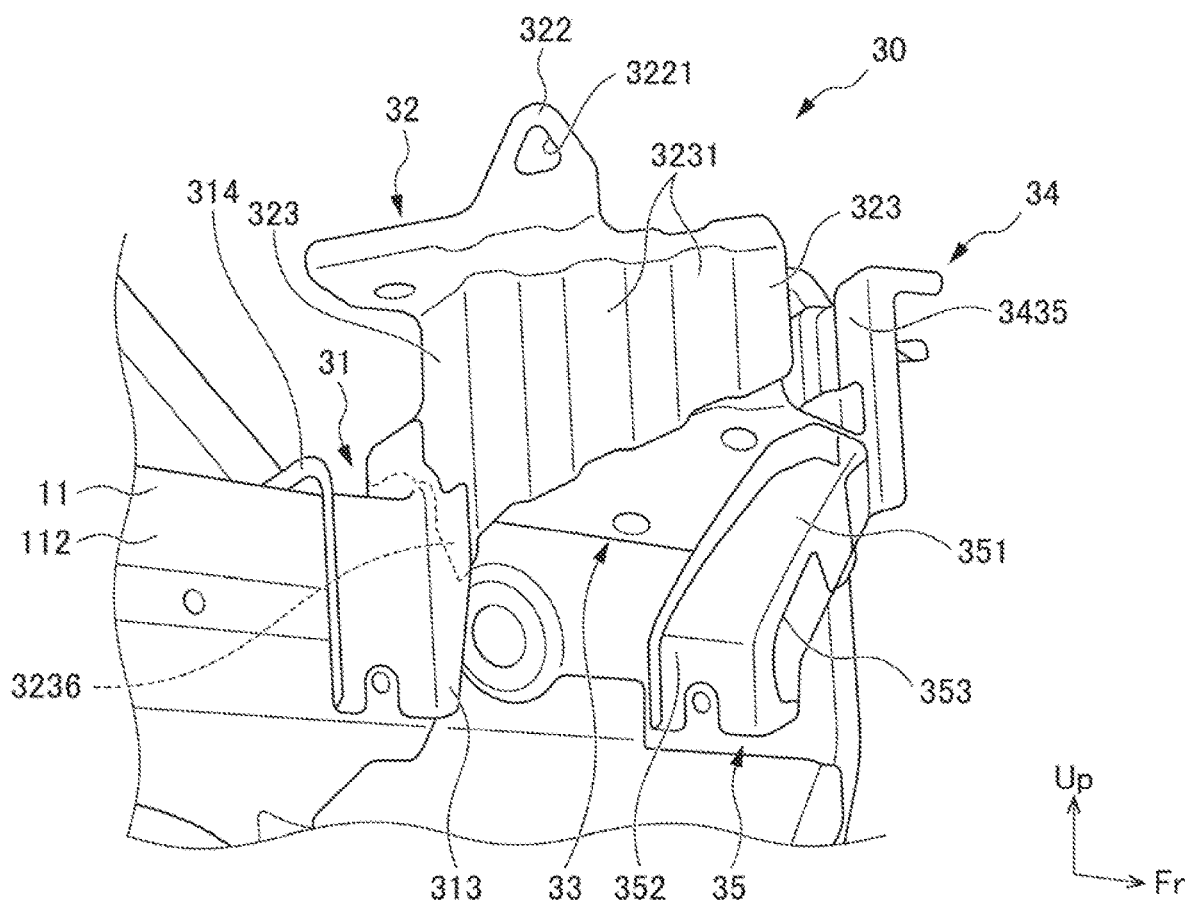
FIG. 3 is an enlarged perspective view illustrating a portion around the front side frame, in which the battery mounting part support structure of the vehicle according to one embodiment of the present invention is provided, viewed from the rear and below.
Figure 4:
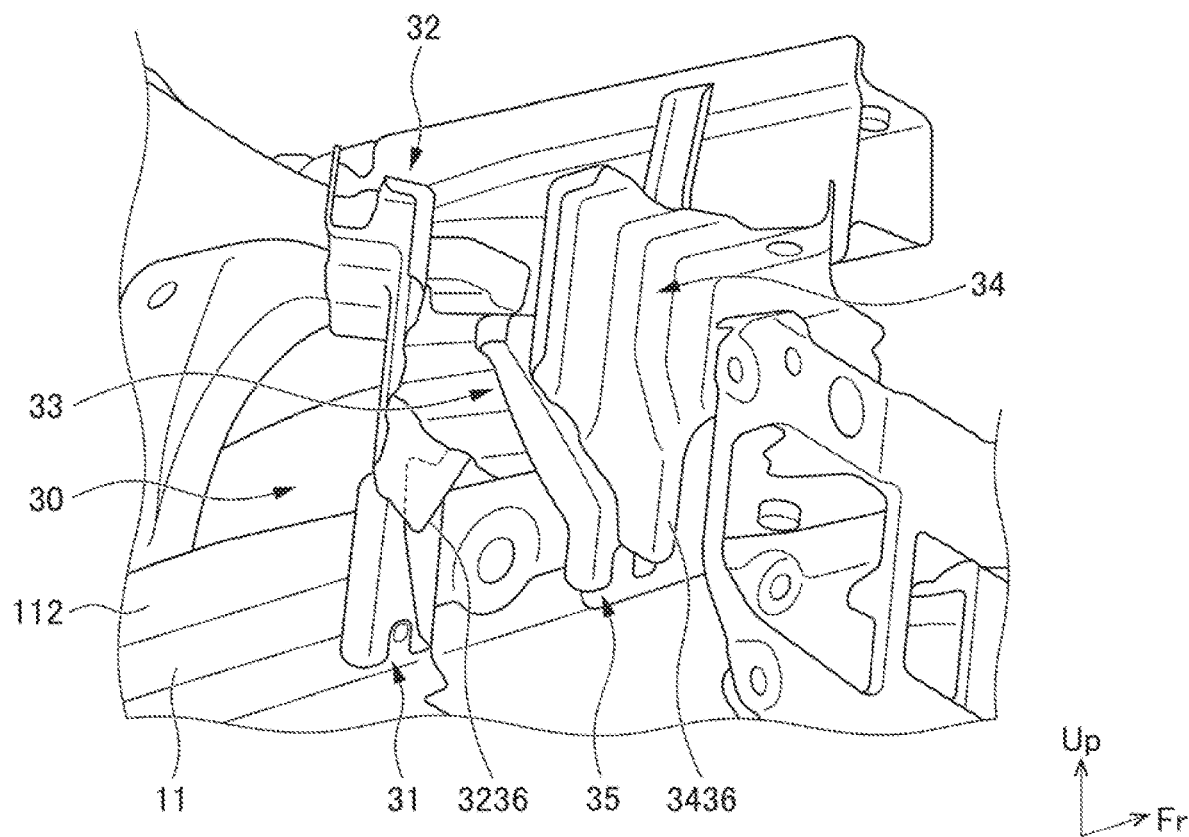
FIG. 4 is an enlarged perspective view illustrating a portion around the front side frame, in which the battery mounting part support structure of the vehicle according to one embodiment of the present invention is provided, viewed from the front and below.

An embodiment according to the present invention will be described in detail with reference to the drawings. FIG. 1 is a perspective view illustrating a portion around a front side frame 11, in which a battery mounting part support structure 30 of a vehicle is provided. FIG. 2 is an enlarged perspective view illustrating a portion around the front side frame 11, in which the battery mounting part support structure 30 of the vehicle is provided, viewed from the front and above. FIG. 3 is an enlarged perspective view illustrating a portion around the front side frame 11, in which the battery mounting part support structure 30 of the vehicle is provided, viewed from the rear and below. FIG. 4 is an enlarged perspective view illustrating a portion around the front side frame 11, in which the battery mounting part support structure 30 of the vehicle is provided, viewed from the front and below.

Figure 5:
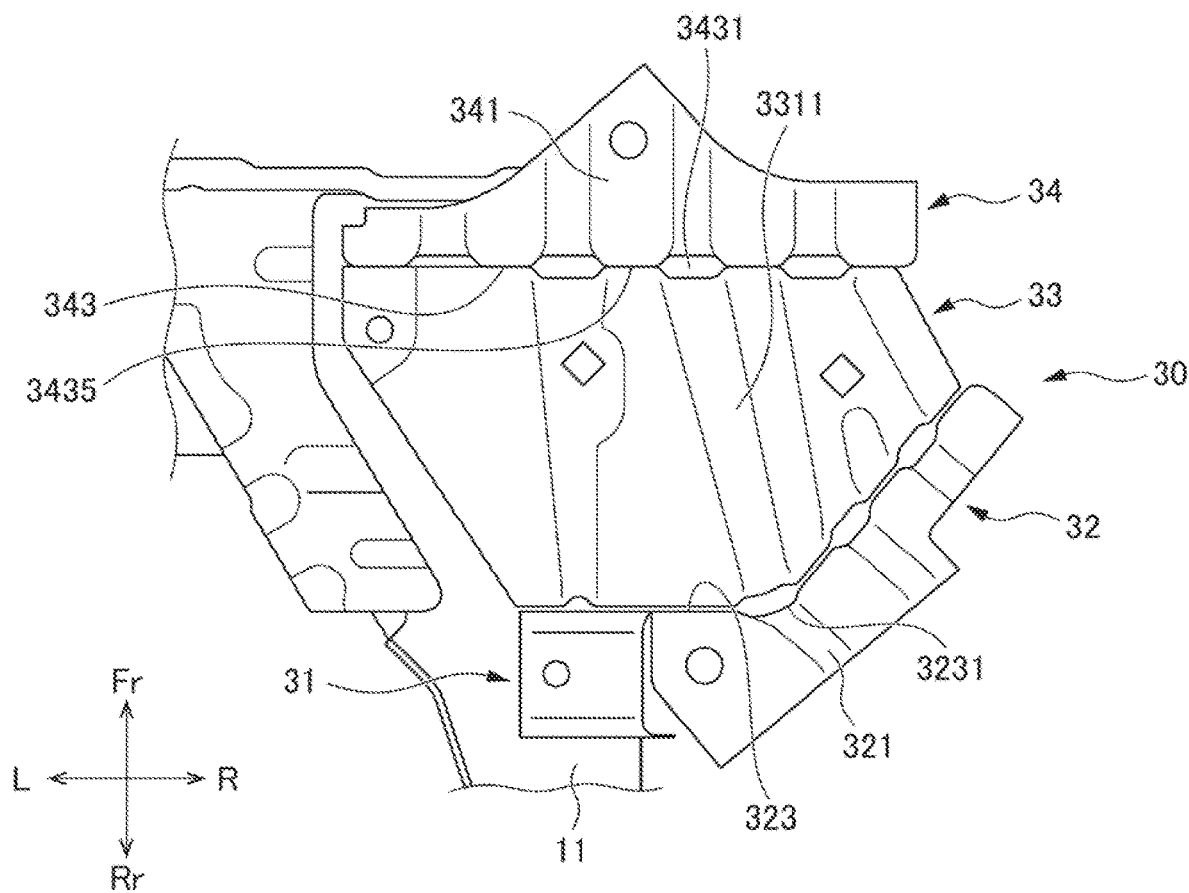
FIG. 5 is an enlarged plan view illustrating a portion around the front side frame, in which the battery mounting part support structure of the vehicle according to one embodiment of the present invention is provided.
Figure 6:
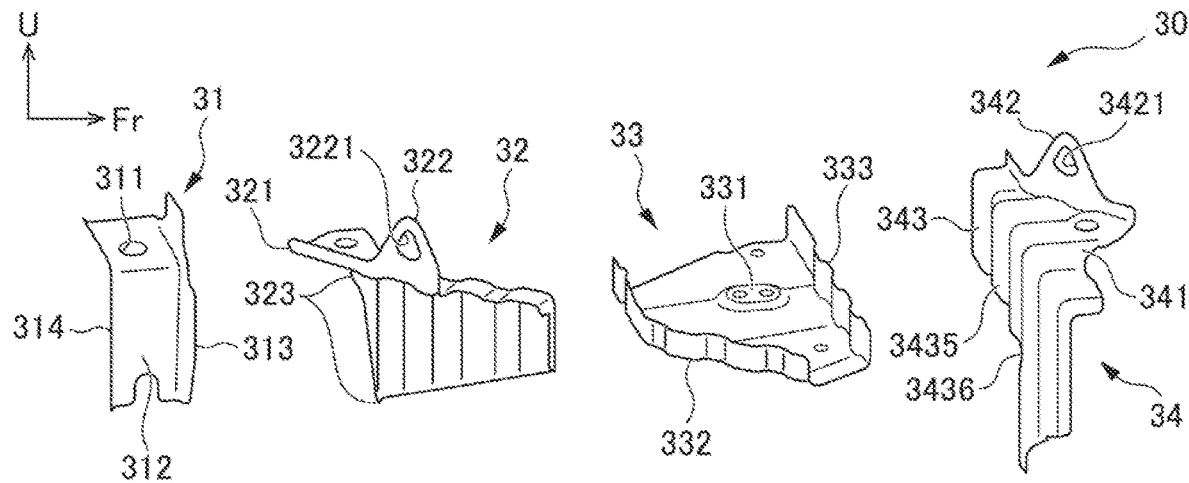
FIG. 6 is an exploded perspective view illustrating the battery mounting part support structure of the vehicle according to one embodiment of the present invention.
Figure 7:
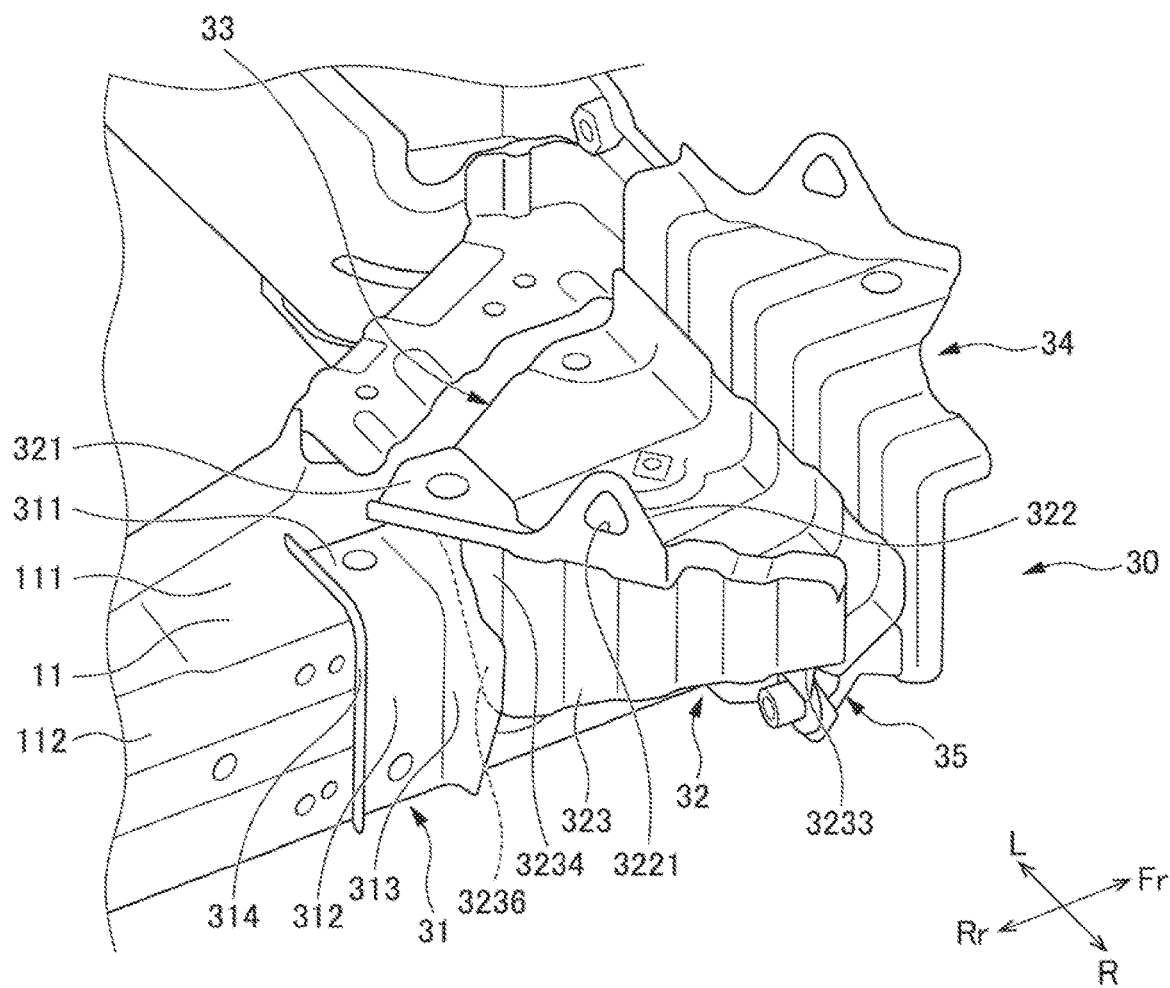
FIG. 7 is an enlarged perspective view illustrating a portion around the front side frame, in which the battery mounting part support structure of the vehicle according to one embodiment of the present invention is provided, viewed from the rear and above.
Figure 8:
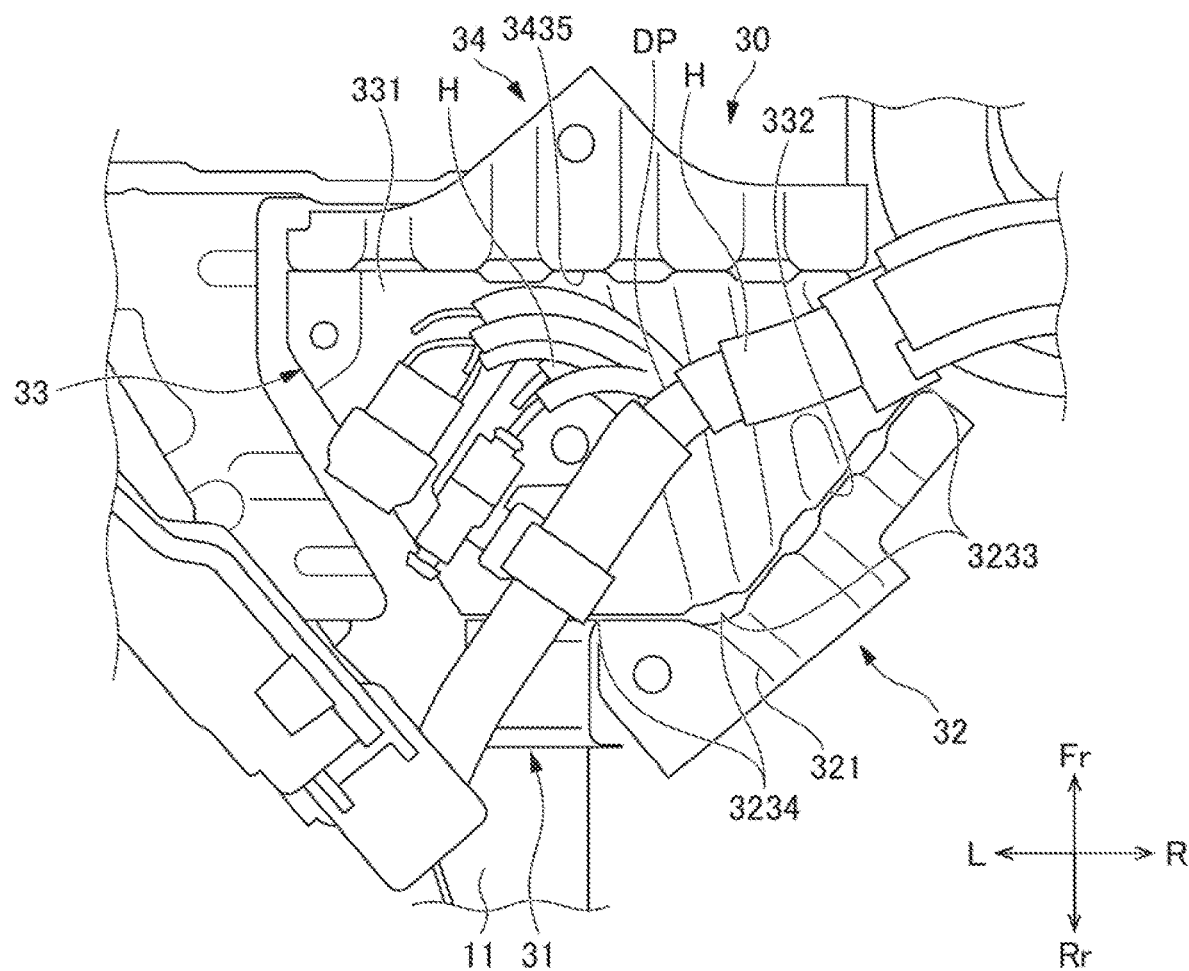
FIG. 8 is an enlarged plan view illustrating an aspect where a harness diverges above a coupling member of the battery mounting part support structure of the vehicle according to one embodiment of the present invention.
Figure 9:
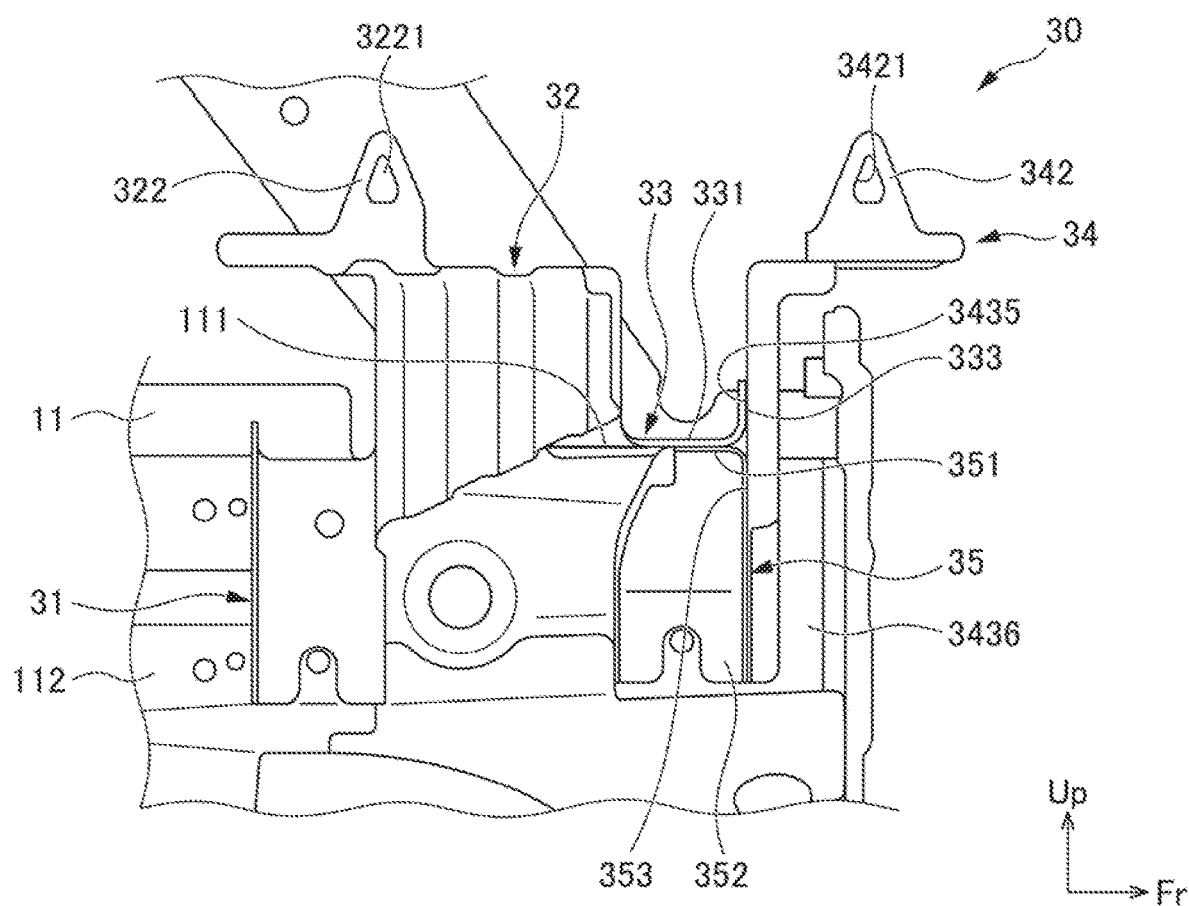
FIG. 9 is an enlarged side view illustrating a portion around the front side frame, in which the battery mounting part support structure of the vehicle according to one embodiment of the present invention is provided.
Figure 10:
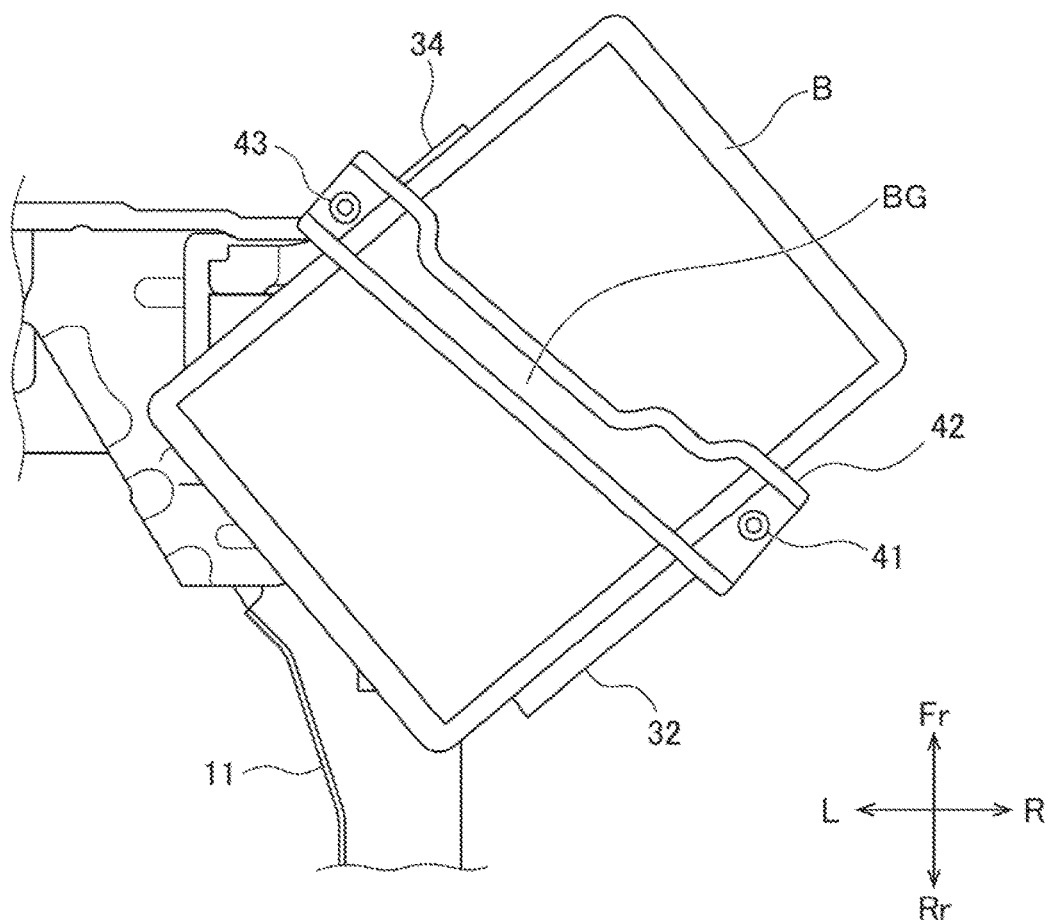
FIG. 10 is an enlarged plan view illustrating an aspect where a battery is mounted in the battery mounting part support structure of the vehicle according to one embodiment of the present invention.

FIG. 5 is an enlarged plan view illustrating a portion around the front side frame 11, in which the battery mounting part support structure 30 of the vehicle is provided. FIG. 6 is an exploded perspective view illustrating the battery mounting part support structure 30 of the vehicle. FIG. 7 is an enlarged perspective view illustrating a portion around the front side frame 11, in which the battery mounting part support structure 30 of the vehicle is provided, viewed from the rear and above. FIG. 8 is an enlarged plan view illustrating an aspect where a harness H diverges above a coupling member 33 of the battery mounting part support structure 30 of the vehicle. FIG. 9 is an enlarged side view illustrating a portion around the front side frame 11, in which the battery mounting part support structure 30 of the vehicle is provided. FIG. 10 is an enlarged plan view illustrating an aspect where a battery B is mounted in the battery mounting part support structure 30 of the vehicle.

In each drawing, an arrow Fr indicates a vehicle body forward direction, an arrow Rr indicates a vehicle body rearward direction, an arrow Up indicates a vehicle body upward direction, an arrow L indicates a left direction in a vehicle width direction, and an arrow R indicates a right direction in the vehicle width direction. Note that in each drawing, illustration of parts will be omitted as appropriate for convenience of explanation.

As illustrated in FIG. 1, a vehicle body front portion having an engine compartment includes a pair of right and left front side frames 11, a pair of right and left bumper beam brackets 12, a bumper beam 13, a pair of right and left subframes 14, a pair of right and left subframe support portions 15, and the like.

The pair of right and left front side frames 11 are respectively provided at a right portion and a left portion in the vehicle width direction so as to extend in a front-back direction of the vehicle body and have a mirror symmetric shape. The pair of right and left front side frames 11 are respectively connected to a right rear portion and a left rear portion of the bumper beam 13 via the bumper beam brackets 12 provided at front ends of the front side frames 11.

As indicated with an arrow in FIG. 1, the pair of right and left front side frames 11 are respectively connected to the subframes 14 via the subframe support portions 15 that extend downward from front end portions of the front side frames 11.

The pair of right and left bumper beam brackets 12 are members that respectively fix the bumper beam 13 at the front ends of the pair of right and left front side frames 11 and have a mirror symmetric shape. The pair of right and left bumper beam brackets 12 are respectively fixed at the front ends of the front side frames 11 and fixed at a right rear portion and a left rear portion of the bumper beam 13.

The bumper beam 13 is provided at a forward portion of a vehicle body front portion structure 1 so as to extend in the vehicle width direction. The bumper beam 13 is connected to the pair of right and left front side frames 11 by being fixed at the bumper beam brackets 12 provided at the respective front ends of the pair of right and left front side frames 11.

The subframes 14 are provided below the front side frames 11. The subframes 14 are connected to the front side frames 11 via the subframe support portions 15 that extend downward from the front end portions of the front side frames 11.

The pair of right and left subframe support portions 15 are members that respectively connect the subframes 14 to the front side frames 11 and the bumper beam brackets 12 and have a mirror symmetric shape. The pair of right and left subframe support portions 15 are respectively fixed at positions at the front ends of the front side frames 11 and fixed at positions at lower ends of the bumper beam brackets 12.

The battery mounting part support structure 30 will be described in detail next. As illustrated in FIG. 6, etc., the battery mounting part support structure 30 includes a rear reinforcing bracket 31, a rear support leg body 32, a coupling member 33, a front reinforcing bracket 35 (see FIG. 3, FIG. 4, FIG. 9, etc.), and a front support leg 34 which are provided as separate independent members and which are provided forward in this order along a portion in the vicinity of the front end portion of the left front side frame 11 of the vehicle body. As illustrated in FIG. 10, the battery B is placed on and supported by the rear support leg body 32 and the front support leg 34 in a positional relationship in which the front support leg 34 is disposed in the vicinity of the center of gravity BG of the battery B.

More specifically, as illustrated in FIG. 6, etc., the rear support leg body 32 includes a battery mounting surface 321 on which the battery B is placed and supported, a battery locking piece 322 that extends upward in a triangular shape at a central portion of one end edge of the battery mounting surface 321, and a support wall 323 that extends downward from the other end edge of the battery mounting surface 321. A locking hole 3221 is provided at the battery locking piece 322, and a lower portion of a locking rod 41 (see FIG. 10) is locked at the locking hole 3221.

An upper portion of the locking rod 41 is coupled to one end portion of a presser plate 42 that presses the battery B from above. In this manner, as illustrated in FIG. 10, the battery B is mounted so that a longitudinal direction of the battery B intersects with a front-back direction at an angle of approximately 45°. Thus, the battery mounting surface 321 and a battery mounting surface 341 which will be described later are disposed so as to intersect with the front end portions of the front side frames 11.

As illustrated in FIG. 3, vertical beads 3231 are provided on the support wall 323. A plurality of the vertical beads 3231 are provided on the support wall 323 so as to extend in an up-down direction from an upper end to a lower end of the support wall 323. As illustrated in FIG. 8, the support wall 323 includes an inclined portion 3233 that has an oblique positional relationship with respect to the front-back direction, and an orthogonal portion 3234 that is orthogonal to the front-back direction in planar view and has a plate shape bent by the inclined portion 3233 and the orthogonal portion 3234.

As illustrated in FIG. 6, etc., the rear reinforcing bracket 31 is constituted with a plate-like member which is integrally formed and bent in an L shape and which has an upper surface 311 and a side surface 312. A plate-like front flange 313 that projects in a direction opposite to a direction in which the rear reinforcing bracket 31 is bent in an L shape and that extends away from a side surface 112 of the front side frame 11 in the vehicle width direction is integrally formed with the upper surface 311 and the side surface 312, bent from the upper surface 311 and the side surface 312 and provided at a front end edge from the upper surface 311 to the side surface 312. Further, a plate-like rear flange 314 that projects in a direction opposite to a direction in which the rear reinforcing bracket 31 is bent in an L shape is integrally formed with the upper surface 311 and the side surface 312 and provided at a rear end edge from the upper surface 311 to the side surface 312.

As illustrated in FIG. 7, etc., the upper surface 311 of the rear reinforcing bracket 31 is joined and fixed to an upper surface 111 of the front side frame 11. The side surface 312 of the rear reinforcing bracket 31 is joined and fixed to the side surface 112 of the front side frame 11. The front flange 313 of the rear reinforcing bracket 31 is joined and fixed while being superimposed on an abutting surface 3236 (see FIG. 7) that constitutes a lower portion of the orthogonal portion 3234 of the rear support leg body 32.

As a result, the rear support leg body 32 is supported by the upper surface 111 and the side surface 112 of the front side frame 11 via the rear reinforcing bracket 31, so that a rear support leg constituted with the rear support leg body 32 and the rear reinforcing bracket 31 is supported by the upper surface 111 and the side surface 112 of the front side frame 11 on a rear side of the coupling member 33.

As illustrated in FIG. 6, the coupling member 33 includes an upper surface 331, a rear flange 332 and a front flange 333 and couples the rear support leg body 32 and the front support leg 34. The upper surface 331 is disposed at a lower position than the battery mounting surface 321 and the battery mounting surface 341, and as illustrated in FIG. 5, has a folding-fan shape that extends forward in a horizontal direction which is the vehicle width direction. As illustrated in FIG. 3, a harness H for supplying power, or the like, from the battery B, the harness H having a diverging point DP that diverges into a plurality of harnesses halfway, is disposed above the upper surface 331 of the coupling member 33.

Further, as illustrated in FIG. 5, etc., a plurality of front-back beads 3311 that extend in the front-back direction are provided on the upper surface 331 of the coupling member 33. Rear end portions of the front-back beads 3311 have a positional relationship matching the vertical beads 3231 of the support wall 323, so that as illustrated in FIG. 5, the vertical beads 3231 are continuous with the front-back beads 3311 in planar view. As illustrated in FIG. 9, a portion of the coupling member 33 having the upper surface 331 is joined and fixed to the upper surface 111 of the front side frame 11 and joined and fixed to an upper surface 351 which will be described later of the front reinforcing bracket 35.

Further, the rear flange 332 has a plate shape that projects upward from a portion which is a portion of the rear end edge of the upper surface 331 and which is located at a position facing the front flange 333, and as illustrated in FIG. 8, is disposed so as to face and abut on the inclined portion 3233 and the orthogonal portion 3234 of the coupling member 33. The front flange 333 has a plate shape that projects upward from the front end edge of the upper surface 331, and as illustrated in FIG. 8, is disposed so as to face and abut on a coupling portion facing surface 3435 of the front support leg 34.

As illustrated in FIG. 3, etc., the front reinforcing bracket 35 is constituted with a plate-like member which is integrally formed and bent in an L shape and which has an upper surface 351 and a side surface 352. The upper surface 351 extends away from the side surface 112 of the front side frame 11 in the vehicle width direction. The side surface 352 is joined and fixed to the side surface 112 of the front side frame 11. A plate-like front side wall 353 that projects in the same direction as a direction in which the front reinforcing bracket 35 is bent in an L shape is integrally formed with the upper surface 351 and the side surface 352 and provided at a front end edge from the upper surface 351 to the side surface 352. The front side wall 353 of the front reinforcing bracket 35 is joined and fixed to the coupling portion facing surface 3435 of the front support leg 34. As a result, the front support leg 34 is joined and fixed to the side surface 112 of the front side frame 11.

The front support leg 34 includes the battery mounting surface 341 on which the battery B is placed and supported, a battery locking piece 342 that extends upward in a triangular shape in the vicinity of a central portion of one end edge of the battery mounting surface 341, a support wall 343 that extends downward from the other end edge of the battery mounting surface 341, and an abutting surface 3436 that is provided in a plate shape along the upper surface 111 and the side surface 112 of the front side frame 11 at a lower end portion of the support wall 343.

A locking hole 3421 is provided at the battery locking piece 342, and a lower portion of a locking rod 43 (see FIG. 10) is locked at the locking hole 3421. An upper portion of the locking rod 43 is coupled to the other end portion of the presser plate 42 that presses the battery B from above.

As illustrated in FIG. 5, vertical beads 3431 are provided on the support wall 343. A plurality of the vertical beads 3431 are provided on the support wall 343 so as to extend in an up-down direction from an upper end to a lower end of the support wall 343, that is, from the battery mounting surface 341 to the abutting surface 3436. As illustrated in FIG. 5, the support wall 343 has a positional relationship such that the support wall 343 faces the support wall 323 in the front-back direction in planar view. As illustrated in FIG. 2, FIG. 4 and FIG. 9, the abutting surface 3436 is joined and fixed along each of the upper surface 111 and the side surface 112 of the front side frame 11. As a result, the front support leg 34 is supported by the upper surface 111 and the side surface 112 of the front side frame 11 on a front side of the coupling member 33.

According to the present embodiment, the following effects are provided. In the present embodiment, the front support leg 34 and the rear support leg (the rear reinforcing bracket 31, the rear support leg body 32) that support the battery B, and the coupling member 33 that couples the front support leg 34 and the rear support leg body 32 are provided, and the front support leg 34 and the rear support leg (the rear reinforcing bracket 31, the rear support leg body 32) are supported by the upper surface 111 and the side surface 112 of the front side frame 11 on a front side and a rear side of the coupling member 33.

By this means, the front support leg 34 and the rear support leg (the rear reinforcing bracket 31, the rear support leg body 32) that support the battery B are supported by the upper surface 111 and the side surface 112 of the front side frame 11 on the front side and the rear side of the coupling member 33, so that it is possible to stably support the front support leg 34 and the rear support leg (the rear reinforcing bracket 31, the rear support leg body 32) by the coupling member 33 and the front side frame 11 and achieve reduction in weight while positions where these are provided are not limited to inside of the front side frame 11.

Further, in the present embodiment, the front support leg 34 and the rear support leg (the rear reinforcing bracket 31, the rear support leg body 32) respectively include the battery mounting surface 341 and the battery mounting surface 321, the support wall 343 and the support wall 323, and the abutting surface 3436 and the abutting surface 3236. This enables the battery mounting surface 341, the battery mounting surface 321, the support wall 343, the support wall 323, the abutting surface 3436, and the abutting surface 3236 to be easily formed through pressing or the like.

Further, in the present embodiment, the vertical beads 3431 and the vertical beads 3231 that respectively extend in the vertical direction from the battery mounting surface 341 and the battery mounting surface 321 to the abutting surface 3436 and the abutting surface 3236 are provided on one of the front support leg 34 and the rear support leg (the rear reinforcing bracket 31, the rear support leg body 32). This can improve support strength of the front support leg 34 and the rear support leg body 32.

Further, in the present embodiment, the coupling member 33 includes a pair of flanges (the front flange 333, the rear flange 332) that are bent so as to face the front support leg 34 and the rear support leg body 32. This enables the coupling member 33 to be stiffly joined to the front support leg 34 and the rear support leg body 32.

Further, in the present embodiment, the vertical beads 3431 and the vertical beads 3231 are continuous with the front-back beads 3311 that extend in the front-back direction of the coupling member 33. This can improve support strength of the front support leg 34 and the rear support leg body 32 and prevent deformation of the coupling member 33.

Further, in the present embodiment, the rear support leg body 32 is joined to the upper surface 111 and the side surface 112 of the front side frame 11 by the rear reinforcing bracket 31 provided as another member. By this means, even if the vertical beads 3231 of the rear support leg body 32 become undercuts, the rear reinforcing bracket 31 is constituted with a member different from a member of the rear support leg body 32, so that it is possible to easily form the rear reinforcing bracket 31 and support the battery B.

Further, in the present embodiment, the inclined portion 3233 of the support wall 323 of the rear support leg body 32 is provided obliquely with respect to the front-back direction in planar view, and the coupling member 33 is provided at a lower position than the battery mounting surface 341 and the battery mounting surface 321 and provided forward in a folding-fan shape. This enables the Harness H to diverge below the battery mounting surface 341 and the battery mounting surface 321.

Further, in the present embodiment, the front support leg 34 is joined to the side surface 112 of the front side frame 11 by the front reinforcing bracket 35 provided as another member. By this means, even if the vertical beads 3431 of the front support leg 34 become undercuts, the front reinforcing bracket 35 is constituted with a member different from a member of the front support leg 34, so that it is possible to easily form the front reinforcing bracket 35.

Further, in the present embodiment, the coupling member 33 extends in the vehicle width direction and is joined to the upper surface 111 of the front side frame 11 and the upper surface 351 of the front reinforcing bracket 35. By this means, the coupling member 33 is joined to the upper surface 111 of the front side frame 11 and the side surface 112 via the front reinforcing bracket 35, so that the front support leg 34 and the rear support leg body 32 can be more stiffly supported.

Further, in the present embodiment, the rear support leg body 32 is joined to the upper surface 111 and the side surface 112 of the front side frame 11 by the rear reinforcing bracket 31 provided as another member, and each of the front reinforcing bracket 35 and the rear reinforcing bracket 31 extends away from the side surface 112 of the front side frame 11 in the vehicle width direction.

This can prevent falling of the battery B even if the rear reinforcing bracket. 31 is fixed to the front side frame 11 and the front reinforcing bracket 35 is offset on an inner side from the front side frame 11. Further, the reinforcing bracket (the front reinforcing bracket 35, the rear reinforcing bracket 31) is divided into front and rear portions, so that reduction in weight can be achieved.

Further, in the present embodiment, the battery mounting surface 341 and the battery mounting surface 321 are disposed so as to intersect with the front end portion of the front side frame 11. This enables the battery B to be stably supported by the front end of the robust front side frame 11.

Further, in the present embodiment, the front support leg 34 is provided in the vicinity of the center of gravity BG of the battery B. By this means, even if the center of gravity BG of the battery B is outside the front side frame 11, it is possible to prevent the battery B from being unstable by receiving vibration by external force.

Further, in the present embodiment, the rear support leg body 32 is bent and joined so as to overlap with the rear reinforcing bracket 31. This enables the rear support leg body 32 to be joined to the robust front side frame 11 via the rear reinforcing bracket 31 and enables the rear support leg body 32 to be bent such that the battery mounting surface 321 is made larger.

Figure 11:
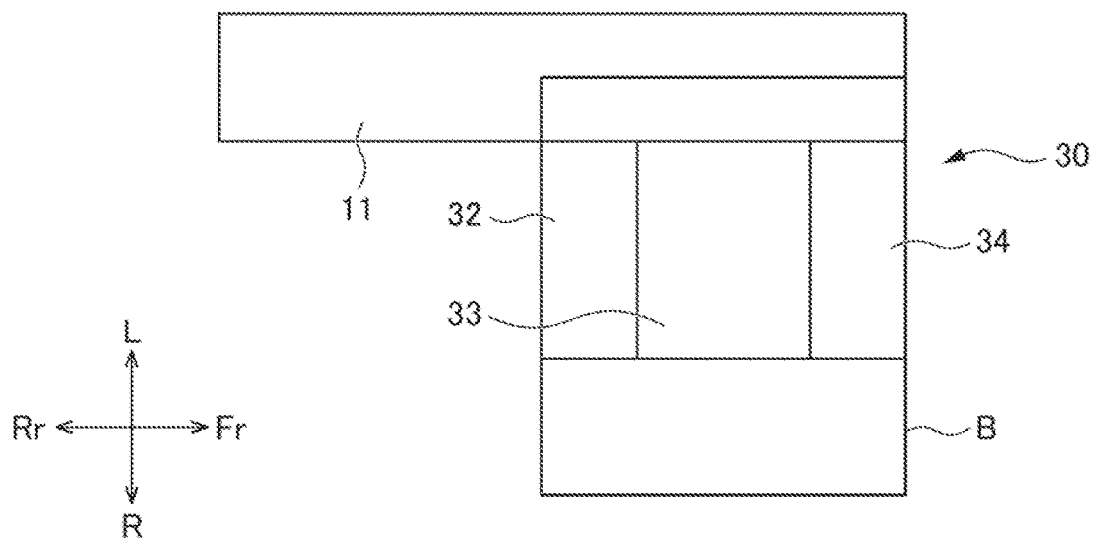
FIG. 11 is an explanatory diagram illustrating an aspect where a battery is mounted in the battery mounting part support structure of the vehicle according to one embodiment of the present invention in a positional relationship different from a positional relationship in the present embodiment.

The present invention is not limited to the above-described embodiment, and modifications, improvements, and the like, within the scope in which the object of the present invention can be achieved are included in the present invention. For example, while in the present embodiment, the battery B is supported so that the longitudinal direction of the battery B intersects with the front-back direction at an angle of approximately 45° as illustrated in FIG. 10, the present invention is not limited to this configuration. For example, by changing a position where the battery locking piece 322 that extends upward in a triangular shape is provided in the rear support leg body 32 as appropriate and by changing a position where the battery locking piece 342 that extends upward in a triangular shape is provided in the front support leg 34 as appropriate, the battery B may be supported so that the longitudinal direction of the battery B is oriented in a width direction orthogonal to the front-back direction of the vehicle as illustrated in FIG. 11. FIG. 11 is an explanatory diagram illustrating an aspect where the battery B is mounted in the battery mounting part support structure 30 of the vehicle in a positional relationship different from the positional relationship in the above-described embodiment.

Further, while the vertical beads 3231 are provided on the support wall 323 of the rear support leg body 32, and the vertical beads 3431 are provided on the support wall 343 of the front support leg 34, the present invention is not limited to this configuration. It is only necessary that the vertical beads that extend in the vertical direction from the battery mounting surface to the abutting surface are provided on one of the front support leg and the rear support leg.

Further, while as illustrated in FIG. 5, the upper surface 331 of the coupling member 33 has a folding-fan shape that extends in the horizontal direction which is the vehicle width direction toward the rearward direction, the present invention is not limited to this configuration. It is only necessary that the coupling member is provided in a folding-fan shape that extends in at least one of the forward direction or the rearward direction.

EXPLANATION OF REFERENCE NUMERALS

11 Front side frame
30 Battery mounting part support structure
31 Rear reinforcing bracket (rear support leg)
32 Rear support leg body (rear support leg)
33 Coupling member
34 Front support leg
111 Upper surface
112 Side surface
313 Front flange (flange)
314 Rear flange (flange)
321, 341 Battery mounting surface
323, 343 Support wall
351 Upper surface
3231, 3431 Vertical bead
3233 Inclined portion
3236, 3436 Abutting surface
3311 Front-back bead
B Battery
BG Center of gravity
H Harness

What is claimed is:

1. A battery mounting part support structure of a vehicle, comprising:
   a front support leg and a rear support leg that support a battery; and
   a coupling member that couples the front support leg and the rear support leg,
   wherein the coupling member includes a pair of flanges that are bent so as to face the front support leg and the rear support leg, and
   wherein the front support leg and the rear support leg are supported by an upper surface and a side surface of a front side frame on a front side and a rear side of the coupling member, and support the battery without interposing the coupling member.

2. The battery mounting part support structure of the vehicle according to claim 1,
   wherein each of the front support leg and the rear support leg includes a battery mounting surface, a support wall and an abutting surface.

3. The battery mounting part support structure of the vehicle according to claim 2,
   wherein a vertical bead that extends in an up-down direction from the battery mounting surface to the abutting surface is provided on one of the front support leg and the rear support leg.

4. The battery mounting part support structure of the vehicle according to claim 2,
   wherein the rear support leg is joined to the upper surface and the side surface of the front side frame by a rear reinforcing bracket.

5. The battery mounting part support structure of the vehicle according to claim 2,
   wherein the front support leg is joined to the side surface of the front side frame by a front reinforcing bracket.

6. The battery mounting part support structure of the vehicle according to claim 5,
   wherein the coupling member extends in a vehicle width direction and is joined to the upper surface of the front side frame and an upper surface of the front reinforcing bracket.

7. The battery mounting part support structure of the vehicle according to claim 5,
   wherein the rear support leg is joined to the upper surface and the side surface of the front side frame by a rear reinforcing bracket, and
   each of the front reinforcing bracket and the rear reinforcing bracket extends away from the side surface of the front side frame in a vehicle width direction.

8. The battery mounting part support structure of the vehicle according to claim 5,
   wherein the battery mounting surface is disposed so as to intersect with a front end portion of the front side frame.

9. The battery mounting part support structure of the vehicle according to claim 1, wherein the front support leg is provided in a vicinity of a center of gravity of the battery.

10. The battery mounting part support structure of the vehicle according to claim 4,
wherein the rear support leg is bent and joined so as to overlap with the rear reinforcing bracket.

11. A battery mounting part support structure of a vehicle, comprising:
a front support leg and a rear support leg that support a battery; and
a coupling member that couples the front support leg and the rear support leg,
wherein the front support leg and the rear support leg are supported by an upper surface and a side surface of a front side frame on a front side and a rear side of the coupling member,
wherein each of the front support leg and the rear support leg includes a battery mounting surface, a support wall and an abutting surface,
wherein a vertical bead that extends in an up-down direction from the battery mounting surface to the abutting surface is provided on one of the front support leg and the rear support leg, and
wherein the vertical bead is continuous with a front-back bead that extends in a front-back direction of the coupling member.

12. A battery mounting part support structure of a vehicle, comprising:
a front support leg and a rear support leg that support a battery; and
a coupling member that couples the front support leg and the rear support leg,
wherein the front support leg and the rear support leg are supported by an upper surface and a side surface of a front side frame on a front side and a rear side of the coupling member,
wherein each of the front support leg and the rear support leg includes a battery mounting surface, a support wall and an abutting surface,
wherein the support wall of the rear support leg is provided obliquely with respect to a front-back direction in planar view, and
the coupling member is provided at a lower position than the battery mounting surface and provided in a folding-fan shape that extends in at least one of a forward direction or a rearward direction.

* * * * *